(12) United States Patent
Springmann et al.

(10) Patent No.: US 8,091,924 B2
(45) Date of Patent: Jan. 10, 2012

(54) DEVICE FOR COUPLING A COOLANT SUPPLY TO A ROLLER

(75) Inventors: Georg Springmann, Mülheim (DE); Dieter Warmbier, Moers (DE); Dirk Hasselbrink, Duisburg (DE); Ulrich Zenz, Duisburg (DE); Peter Jonen, Duisburg (DE); Michael Steuten, Moers (DE)

(73) Assignees: Georg Springmann Industrie- und Bergbautechnik GmbH, Mülheim (DE); SMS Siemag Aktiengesellschaft, Düsseldorf (DE)

( * ) Notice: Subject to any disclaimer, the term of this patent is extended or adjusted under 35 U.S.C. 154(b) by 579 days.

(21) Appl. No.: 12/091,856

(22) PCT Filed: Oct. 26, 2006

(86) PCT No.: PCT/EP2006/067840
§ 371 (c)(1),
(2), (4) Date: Oct. 6, 2008

(87) PCT Pub. No.: WO2007/048834
PCT Pub. Date: May 3, 2007

(65) Prior Publication Data
US 2009/0295151 A1 Dec. 3, 2009

(30) Foreign Application Priority Data
Oct. 28, 2005 (DE) .......................... 10 2005 052 067

(51) Int. Cl.
*F16L 27/00* (2006.01)
(52) U.S. Cl. ..................................... 285/121.4; 285/275
(58) Field of Classification Search ............... 285/120.1, 285/121.3–121.6, 99, 275, 278, 279
See application file for complete search history.

(56) References Cited

U.S. PATENT DOCUMENTS

| | | | | |
|---|---|---|---|---|
| 2,424,545 A * | 7/1947 | Bard | .......................... | 174/21 JC |
| 2,793,058 A * | 5/1957 | Jacobson | ........................ | 285/15 |
| 3,057,646 A * | 10/1962 | Brumagim | .................... | 277/401 |
| 3,061,337 A * | 10/1962 | Shaw et al. | ................ | 285/121.4 |
| 3,405,959 A * | 10/1968 | Walker | .......................... | 285/276 |
| 3,843,171 A * | 10/1974 | Hewlett | ........................ | 285/98 |
| 4,422,676 A * | 12/1983 | Sitabkhan | .................. | 285/121.4 |
| 5,169,181 A * | 12/1992 | Timm et al. | .................. | 285/276 |
| 5,992,901 A * | 11/1999 | Gohres et al. | ............. | 285/121.2 |
| 6,406,065 B1* | 6/2002 | Ott et al. | .................... | 285/120.1 |
| 6,412,822 B1* | 7/2002 | Omiya et al. | ............... | 285/121.3 |

(Continued)

FOREIGN PATENT DOCUMENTS

DE 42 07 042 C1 9/1993

(Continued)

*Primary Examiner* — Aaron Dunwoody
(74) *Attorney, Agent, or Firm* — Henry M. Feiereisen; Ursula B. Day

(57) ABSTRACT

A device for coupling a coolant supply to a roller, in particular for continuous casting installations, wherein the roller is supported for rotation in a stationary pillow block, includes a sealing unit coupled to an axial roller borehole in a pressure-tight manner, and a stationary pillow block cover releasably attached to the pillow block and covering the axial roller borehole. An insert may extend through a center opening of the pillow block cover and be attached to the pillow block cover by a flange. The inside diameter of the center opening of the pillow block cover may be greater than an outside diameter of the bush to enable a removal of the sealing unit from the roller borehole without removal of the pillow block cover.

17 Claims, 3 Drawing Sheets

U.S. PATENT DOCUMENTS

| | | | |
|---|---|---|---|
| 6,698,669 B2 * | 3/2004 | Rieben | 239/225.1 |
| 7,399,001 B2 * | 7/2008 | Maier | 285/121.4 |
| 7,416,224 B2 * | 8/2008 | Ott | 285/121.1 |
| 7,611,169 B2 * | 11/2009 | Springmann et al. | 285/122.1 |
| 7,841,627 B2 * | 11/2010 | Springmann et al. | 285/121.2 |
| 2001/0031606 A1 * | 10/2001 | Schafer et al. | 451/5 |
| 2002/0000251 A1 * | 1/2002 | Suzuki et al. | 137/580 |
| 2003/0006655 A1 * | 1/2003 | Zhang | 310/52 |
| 2003/0116964 A1 * | 6/2003 | Springmann et al. | 285/226 |
| 2003/0197368 A1 * | 10/2003 | Reifschneider et al. | 285/121.6 |
| 2006/0108102 A1 * | 5/2006 | Springmann et al. | 165/89 |
| 2007/0228726 A1 * | 10/2007 | Springmann et al. | 285/280 |
| 2011/0001316 A1 * | 1/2011 | Ford et al. | 285/99 |

FOREIGN PATENT DOCUMENTS

| | | |
|---|---|---|
| DE | 197 52 336 C | 4/1999 |
| DE | 100 17 184 A1 | 10/2001 |
| GB | 2095353 A * | 9/1982 |
| WO | WO 9730307 A1 * | 8/1997 |
| WO | WO 0177566 A1 * | 10/2001 |
| WO | WO 2004/091830 | 10/2004 |
| WO | WO 2004091830 A1 * | 10/2004 |

* cited by examiner

DEVICE FOR COUPLING A COOLANT SUPPLY TO A ROLLER

BACKGROUND OF THE INVENTION

The invention relates to a device for coupling a coolant supply to a roller, in particular for continuous casting installations.

In the case of continuous casting installations, red-hot steel runs in continuous strand form over rollers which are mounted, on their ends, via journals in a pillow block by means of roller bearings. The rollers are cooled in a closed loop by means of supplying a pressurized coolant (in particular water) into the interior of the roller in order to remove the heat, which can be realized, for example, by the water duct via an axial roller borehole guided through the journals.

DE 42 07 042 C1 discloses a device for coupling the cooling medium supply to a supporting and/or transporting roller, in particular for continuous casting installations, in which each pillow block is covered by a cover. The cover has a cooling duct which is connected to a further cooling duct in the pillow block for connecting to a coolant supply means or coolant removal means and leads at its other end into the region of the journal borehole. The encapsulated unit which is formed in this manner enables the structural elements to be relatively well protected against wear, since the structural elements are protected against the partly aggressive surroundings of the continuous casting installation (e.g. splash water) and against external mechanical influences.

However, this device firstly has the drawback that the elements of pillow block and pillow block cover that are adjusted precisely to each other in order to form the coolant duct make it difficult to refit existing continuous casting installations. Above all, however, it is difficult for maintenance work to be carried out on this device because the entire pillow block cover has to be dismounted in order to permit access to the structural elements (the elastic compensator, the sealing units provided thereon, roller bearings, etc.) covered by said cover.

DE-A1-10017184 discloses a two-part lead-through for coupling a coolant supply to a roller, the roller being mounted via journals in pillow blocks by means of roller bearings and being provided with the coolant by means of axial bores through the journals, in particular for continuous casting installations.

WO 0491830 discloses a further device for coupling a coolant supply to a roller, wherein the roller is mounted via journals in a pillow block by means of roller bearings and wherein the roller can be provided with a coolant via an axial roller borehole which is led through the journals, a pillow block cover, which can be fixed to the pillow block in order to cover the roller bore and which comprises at least one coolant duct which can be connected to the cooling supply, and at least one sealing unit being arranged between the roller borehole and the pillow block cover.

This device enables an access from the outside in particular to the sealing unit, for example in order to carry out maintenance work, if the inset is dismounted from the pillow block cover, without requiring removing the entire pillow block cover.

SUMMARY OF THE INVENTION

Although the two latter lead-through known from the prior art already have good properties particularly regarding lifetime and maintenance properties, a lead-through being further improved with regard to maintainability and accessibility to the components is desirable.

The invention relates to a device for coupling a coolant supply to a roller, in particular for continuous casting installations, the roller being mounted in a pillow block by means of roller bearings via journals and wherein the roller can be supplied with a coolant via an axial roller borehole guided through the journals, with
- a sealing unit which can be fixed to the roller journal in order to couple it to the roller borehole in a pressure-tight manner and which has an axial borehole; and
- a pillow block cover which can be fixed to the pillow block in order to cover the axial roller borehole and which has at least one coolant duct being connectable to the coolant supply, said coolant duct being enabled to be coupled via the sealing unit to the axial roller borehole;

wherein the sealing unit is configured as a two-part sealing unit having a bush which can be inserted into a seat in the roller borehole and having a first sealing element being fixed to said bush and rotating therewith and having a first sealing surface, and a second sealing element having a second sealing surface running on said first sealing surface and being supported by or integrated into said pillow block cover, wherein said bush which can be inserted into said roller borehole is secured in the fitted state via a screw-less plug-connection in said roller borehole.

According to the invention, said bush carrying said sealing element can be plugged into a seat in the roller borehole and is detachably connected with the roller borehole in the fitted state by means of a screw-less plug-connection. In the most simple case, said bush can be secured in said roller borehole, which is preferably made as a cylindric seat, by means of one or more O-rings being arranged in the gap between said bush and said roller borehole, for example in a respective outer groove in said bush or in a respective inner groove in said borehole.

Due to the configuration of the connection between the bush and the seat in the borehole as a screw-less plug-connection, the bush with the sealing element fixable thereto can be plugged without screwing during the mounting of the device according to the invention in a simple way into the borehole in a plug-in position, preferably having a form-fit, and the bush can be pulled-off from the borehole for the sake of maintenance work with the pillow block cover being detached in the same simple way, if required using a pulling-off device, without the need to release screws before. In this way, a particular simple and fast mounting is guaranteed.

According to a further embodiment, also the second sealing element can be detachably connected in the mounted state with the pillow block cover via a screw-less plug-connection. This embodiment has the advantage that also at the side of the pillow block cover a plug-connection is used and that the sealing element, which may also be fixed on an inset which may be inserted in the pillow block cover, can be detached in the case of maintenance in a fast and simple way.

In the case of a configuration of the sealing unit as a two-part sealing unit, the sealing element being fixed on the pillow block cover remains, in the case of maintenance and after removal of the pillow block cover, on the pillow block cover, while the bush which is fixed via a screw-less plug-connection in the borehole remains with the sealing element fixable thereto in the borehole. In the next step, the bush and the sealing element being fixed on the pillow block cover, if secured via a screw-less plug-connection to the pillow block cover, can be pulled-off from the roller borehole in a simple way. Thereby, a fast assembling and disassembling of the device according to the present invention is possible without the need of a screw connection.

According to a further development of the present invention, the first sealing element is carried by an elastic sleeve, said sleeve being fixed in a pressure-tight manner to the bush which can be plugged in the roller borehole. During rotation of the roller, the first sealing element runs during operation with his sealing surface on the sealing surface of a second sealing element which is carried by the pillow block cover. In an inverse configuration, the second sealing element is carried by an elastic sleeve which is fixed in a pressure-tight manner to the pillow block cover, whereas the first sealing element is carried by the bush which may be plugged in the roller borehole.

In both configurations of the sealing elements in the assembled state, the sealing elements are held in the operating position by the contact pressure of the elastic sleeve, preferably a compensator, and thereby have a reliable sealing effect. Preferably, the dimensions of the compensator are such that the compensator is, in its operating position, mounted with an initial tension provided during assembly due to the length of the compensator to thereby enhance the contact pressure of the two sealing elements on each other.

In a particular embodiment, the device of the present invention comprises a sealing unit which comprises as sealing elements two sliding rings running on each other, wherein one of said sliding rings is carried by the pillow block cover and the other one of said sliding rings is carried by the elastic sleeve. In this embodiment it is guaranteed that the moments of tilt acting in operation on the sealing unit during loading of the roller are compensated due to the radial mobility of the sliding rings and the elastic sleeve, and the lifetime of the device is thereby enhanced. According to the invention, sliding rings made of a hard material, particularly silicon carbide, are preferred.

Furthermore, the bush can be provided with a mechanical stop to limit the plug-in depth in the axial roller borehole. Such a mechanical stop can e.g. be made in the form of a collar on said bush, wherein said bush adjoins outside at the roller journal or is in engagement therewith. Alternatively, projections or journals can be provided at the edge of the bush and prevent that the bush is inserted too far into the roller borehole.

In order to prevent that the bush which is fixed in the roller borehole by means of a screw-less plug-connection is moved, due to impingement of the end of the bush which faces the interior of the roller with vapour pressure and due to a steam shock in the continuous casting installation, too far out of its operating position, and that the sealing unit, in particular the elastic sleeve, is damaged, a mechanical stop can be provided at one of the two sealing elements, wherein said mechanical stop can be configured as a collar which radially surrounds the sealing element, and wherein the collar is pressed during impingement of the bush with pressure due to the steam shock against the other sealing element and thereby limits the relative radial mobility of the two sealing elements. With the same effect like a collar, projections which extend in a direction co-axial with the roller axis can be provided, too.

Although the fixation of the bush in the seat of the roller borehole can already be achieved by means of one or more O-rings, thereby also preventing a rotation of the bush in the roller borehole, the screw-less plug-connection(s) can be provided, also at the side of the pillow block cover, with an antitwist protection. Such an antitwist protection can be configured, e.g. in form of one or more projections at the bush, which engage in two corresponding recesses at the roller journal. Such one or more recesses can also be configured as a ring plate which covers the roller journal end and the roller bearings. In a preferred embodiment, the antitwist protection can also be configured as a terminal collar which adjoins to the roller journal end or which is in engagement therewith, or in form of a projection, which is in the assembled state in engagement with a corresponding recess at the roller journal end. The use of a protection of the kind of a bayonet joint is also possible.

A Siphon pipe, which can be fixed on the pillow block cover, can be plugged through the bush and the sealing unit for water supply for the operation of the continuous casting installation, wherein the coolant, preferably cooling water, is supplied therethrough into the interior of the roller. As a rule, the bush is therefore open at both sides.

The bush can be configured such that it can be brought into engagement—in its assembled state—with a pulling-off device for the sake of maintenance work, in order to pull the bush out of the roller borehole. For this purpose, the bush may comprise pulling-off means which can be brought into engagement, in the assembled state of the bush, with a pulling-off device for pulling-off from the roller journal. These pulling-off means can be configured as boreholes in the bush, wherein the pulling-off device can be brought into engagement with these boreholes, or the dimensions of the bush can be selected such that in the plug-in position an axial gap remains between the bush and the roller borehole in direction to the interior roller, wherein hooks can be inserted into said gap, wherein such hooks engage into the bush or behind the bush and thereby permit a pulling out of the roller borehole.

The maintenance of the device according to the invention is further facilitated if an inset, which carries the sealing unit in the assembled state, can be inserted into a borehole provided in the pillow block cover and being co-axial to the roller axis. The inset for coupling the coolant duct in a pressure tight manner via the sealing unit to the roller borehole comprises at least one cooling duct which couples, in the assembled state of the inset, to the coolant duct provided in the pillow block cover and to the sealing unit.

The diameters of the inset and the attributed borehole in the pillow block cover are preferably selected and adapted to each other in such a way that the bush can be pulled-off from the borehole in the roller, if required using a pulling-off device, through the borehole in the pillow block cover, without the need to remove the pillow block cover, if the inset is detached. This embodiment enables in a particular simple way an access to the components of the lead-through, without the need to release screws within the space being covered by the pillow block cover. As a consequence, the components of the device according to the present invention can inspected in a simple way and can be exchanged, if required, during maintenance work.

The inset preferably comprises at least one coolant duct, which couples in the assembled state the inset to a coolant duct in the pillow block cover.

According to another embodiment, the inset comprises a first coolant duct and a second coolant duct, which couple in the assembled state of the inset to the first or second coolant duct, respectively, in the pillow block cover. Preferably, one of these coolant ducts of the pillow block cover can be connected to a coolant supply, and the other coolant duct can be connected to a coolant removal. In such a so-called "Duo-lead-through", the coolant is guided through the first coolant duct and the sealing unit and a siphon pipe into the interior of the roller and guided back through the second coolant duct in the pillow block cover, for example to a water removal at the bottom in order to be removed from there. In this embodiment, the siphon pipe can be plugged into the inset and consequently forms a ring gap being arranged concentrically to the roller axis for a recirculation of the coolant.

According to a further development, a connecting pipe can be inserted into the at least one coolant duct of the pillow block cover for connecting to a contact area of the pillow block cover being coupled to the coolant supply and/or the coolant removal, such that the connection to the cooling water supplies and the cooling water removals being provided at the bottom is guaranteed.

According to a further embodiment, the device according to the present invention can be configured such that the pillow block cover comprises a fastening collar being arranged at the pillow block, wherein the pillow block cover can be fixed to the pillow block by means of said fastening collar via fastening screws, and such that the area of the pillow block cover into which the inset can be inserted, said area being raised with respect to the fastening collar, has a diameter of the order of the diameter of the roller bearing in the pillow block. In the raised area of the pillow block cover the at least one cooling water duct guided away from the inset or in direction to the inset can be bored-through in a direction radial outwardly to the edge of the pillow block cover, wherein this borehole is closed during operation of the continuous casting installation preferably by a screw plug. This screw plug can be unscrewed for the sake of maintenance works during the outage of the installation, thereby enabling the supply of pressurized air in order to deliver the cooling water from the interior of the roller by means of blowing out.

It was also found out by the inventors that a device for coupling a coolant supply to a roller, in particular for continuous casting installations, as the one according to the present invention can be improved with regard to its repair and service facilities by means of a seal comprising a pair of sliding rings, wherein the sealing unit is configured as a two-part sealing unit having a first sliding ring with a first sealing surface and a second sliding ring with a second sealing surface running on said first sealing surface, wherein both sliding rings are arranged in a sliding ring support, wherein at least one of these two sliding rings comprises an externally surrounding sliding ring collar and can be inserted into a cylindric recess provided in the slide ring support, wherein the sliding ring can be fastened by means of a locking ring which may be inserted into a surrounding groove in the slide ring support. In this way it is guaranteed that the sliding ring can be inserted into its support in a simple way and secured by a locking ring without the need of glueing the sliding ring. In case of maintenance, the sliding ring is detached e.g. by means of nipper and the sliding ring can be taken out from the support. In a further embodiment of a seal comprising a pair of sliding rings, at least one of the two sliding rings is provided with at least one projection, which engages into a corresponding recess in the support which holds the sliding ring. Thereby a twisting of the sliding ring in the support is reliably avoided.

Further embodiments of the invention can be gathered from the following specification and the dependent claims.

BRIEF DESCRIPTION OF THE DRAWING

The invention will herein after be explained in more detail with reference to the embodiment being illustrated in the attached drawings.

In the drawings.

DETAILED DESCRIPTION OF PREFERRED EMBODIMENTS

Figure 1:
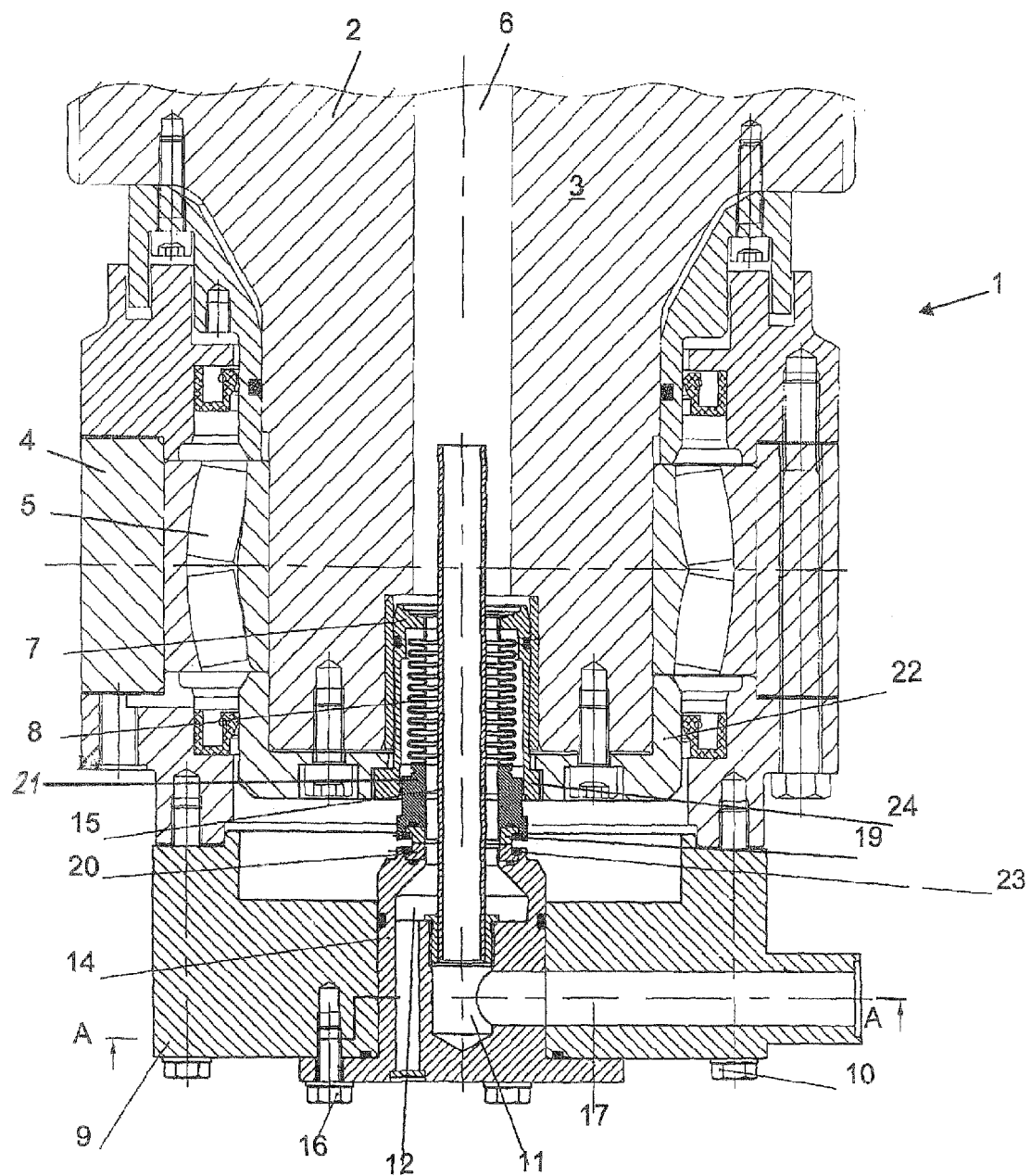
FIG. 1 shows a partial view of an embodiment of the device according to the present invention in the longitudinal section.

According to FIG. 1, a device 1 according to the invention is used for coupling a coolant supply (not shown) to a roller 2 of a continuous casting installation, the roller 2 being mounted in a pillow block 4 by means of roller bearings 5 via a journal 3. The roller 2 can be supplied with a coolant via an axial roller-borehole 6 guided through the journal 3.

A bush 7, which is used for holding an elastic sleeve which is preferably configured as a compensator, can be plugged, preferably with form-fit, into the roller journal 3. Besides the preferred embodiment of the sleeve in the form of a compensator made of stainless steal, the elastic sleeve may also be made of other materials which impart elasticity, for example in the form of a rubber hollow cylinder which is optionally reinforced with fabric and is fitted into the bush 7. This permits the sleeve 8 to be particularly flexible and reduces the wear of the device according to the invention when the roller is subjected to a load.

The bush 7 can be provided with means to limit the plug-in depth in the roller borehole, wherein said means can be configured in the simplest case in form of a terminal collar 24 which adjoins on the end of the roller journal or which engages into a ring plate 22 covering the end of the roller journal 3. Additionally, the bush 7 can be provided with an antitwist protection which engages in the assembled state into a corresponding recess provided at the end of the roller journal. Such a recess can also be formed in the ring plate 22.

A pillow block cover 9 is fixed on the pillow block 4. According to the illustrated embodiment, the pillow block cover 9 comprises a first cooling duct 17 as well as, in the case of a supply and a removal of the cooling water on the same side of the roller, a second coolant duct 18, wherein one end of the coolant duct 17 can be connected to a coolant supply and one end of the coolant duct 18 can be connected to a coolant removal (both not being illustrated).

The pillow block cover 9 shown in FIG. 1 covers the side face of the pillow block 4 at least partially. In this case, an inset 14 with a siphon pipe 15 being fixed to it in a pressure-tight manner is inserted into the pillow block cover 9. The siphon pipe 15 pointing to the interior of the roller is dimensioned in such a manner that it protrudes into the outwardly pointing end section of the guide pipe used for the cooling water and reaching into the interior of the roller and not being illustrated in the Figure and that an annular gap is formed between the pipes. The annular gap is dimensioned in such a way that, on the one hand, the pipes are rotatable relative to each other and at the same time only a small flow rate of cooling water through them is permitted.

Figure 3:
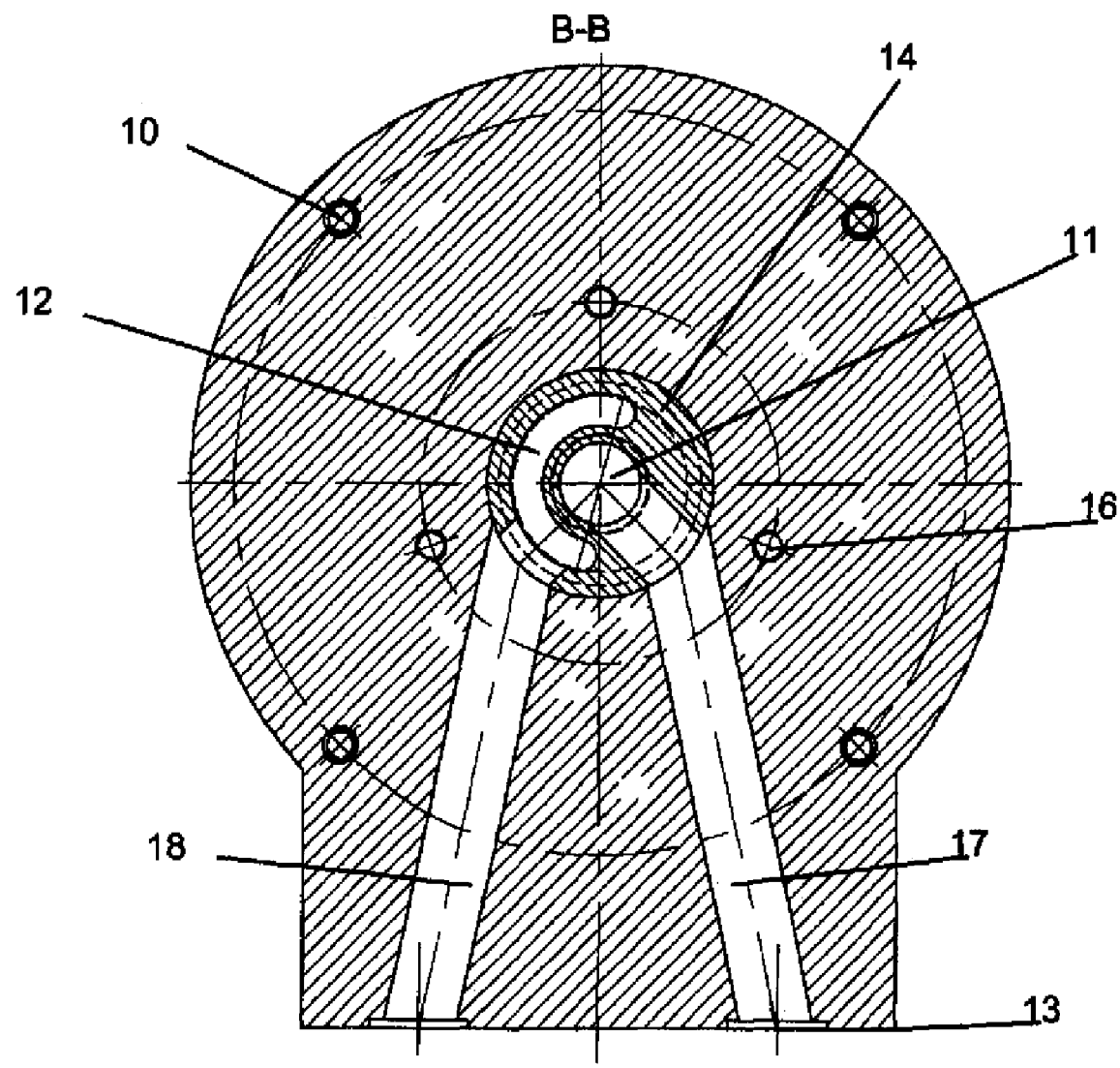
FIG. 3 shows a cross-sectional view of the embodiment of the device according to the present invention along the line A-A of FIG. 1.

As shown in FIG. 3, the inset 14 has a first coolant duct 11, which is coupled to the siphon pipe 15, and, in the case of cooling water being supplied and removed on the same side of the roller, a second coolant duct 12 for removing the cooling water, as shown in the Figures. The cooling ducts 11 and 12 lead respectively to the duct sections 17 and 18 in the pillow block cover as well as to the roller borehole 6 at the other end in such a manner that the roller borehole is coupled to the coolant ducts 11 and 12 in order to supply and remove the cooling water.

According to FIG. 1, a sealing unit is provided between the inset 14 and the roller borehole 6, which sealing unit, according to the embodiment, has in particular a sliding ring, which is arranged on that end of the inset 14 which faces the bush 7, as sealing element 19 and, corresponding to the first sealing element 19, a further sealing element 20, which is constructed as a sliding ring, on an extension piece 21 arranged on the sleeve 8 at the end facing the pillow block cover 9. According to the embodiment of FIG. 1, the sealing surfaces of the sealing elements 19 and 20 are therefore arranged perpendicularly with respect to the axis of rotation of the roller.

This geometrical arrangement of the sealing surfaces of the sealing elements 19 and 20 is preferred, since the forces acting on the sealing elements can thus be better compensated, but this geometrical arrangement of the sealing surfaces of the sealing elements 19 and 20 is not necessarily required in the case of the device 1 according to the invention if other sealing units with sealing elements interacting in a different manner are used.

Preferably at least one of the two sliding rings 19, 20 in particular made of silicon carbide, is secured on the inset 14 or the extension piece 21 of the elastic sleeve 8 by means of a securing ring 23. In a further development at least one of the two sliding rings 19, 20 comprises, at its end turned away from the other sliding ring 19, 20, an external surrounding sliding ring collar and can be inserted in a cylindrical recess provided in the inset 14 or in the extension piece 21 or the elastic sleeve 8, respectively, wherein the sliding ring 18, 19 can be secured by means of a securing ring 23 which may be inserted into a groove surrounding in the interior of the cylinder in the cylindrical recess and engages at the sliding ring collar.

Connecting pipes (not illustrated) can be inserted in the coolant ducts 17 and 18 of the pillow block cover 9 and are thus connected to the pillow block footprint 13, which is in turn coupled to the coolant removal means (not shown) and/or coolant supply means.

The pillow block cover 9 is preferably provided with bores (not shown), which are co-axial with the roller axis, into the coolant ducts 17 and 18 which can be closed by closure stoppers (not shown) which can be screwed into them. The closure stoppers can be unscrewed for maintenance work to the continuous casting installation. Thus it is possible for a flushing medium, such as compressed air, to be supplied in order to free the interior of the roller by blowing out the cooling water and thus to facilitate the maintenance work.

The pillow block cover 9 is fastened to the pillow block 4 preferably in a releasable manner by means of fastening screws 10 which can be arranged, in particular equidistantly, along the circular circumference of the pillow block cover 9. The inset 14 is likewise fastened releasably to the pillow block cover by means of fastening screws 16. As a result, access from the outside to the components which are covered in the fitted state by the inset 14, in particular to the sealing unit, in order to carry out maintenance work can easily take place by release of the fastening screws 16 and subsequent removal of the inset 14 without a removal of the entire pillow block cover 9 from the device 1 being necessary for this. For this purpose, the inset 14 is preferably dimensioned in such a manner that, when the inset 14 is removed, an access from the outside to the components which are covered, in the fitted state, by the inset 14, in particular to the sealing unit, is possible in such a manner that the sealing unit 7, 8, 19, 20 can be removed from the roller borehole 6 owing to the unobstructed access to the bush 7, if given by making use of a pulling-off device.

On the contrary, with the inset 14 fitted in the pillow block cover 9, firstly the coolant supplies 11, 12, 17 and 18 and secondly the sealing unit 7, 8, 19, 20 are protected against the aggressive surroundings of the continuous casting installation, and therefore an excessive amount of wear is avoided.

The device according to the invention can also easily be fitted in an already existing continuous casting installation, since all the means characterizing the invention are provided on the pillow block cover, and the functioning of the device according to the invention is therefore independent of the design of the pillow block 4.

Figure 2:
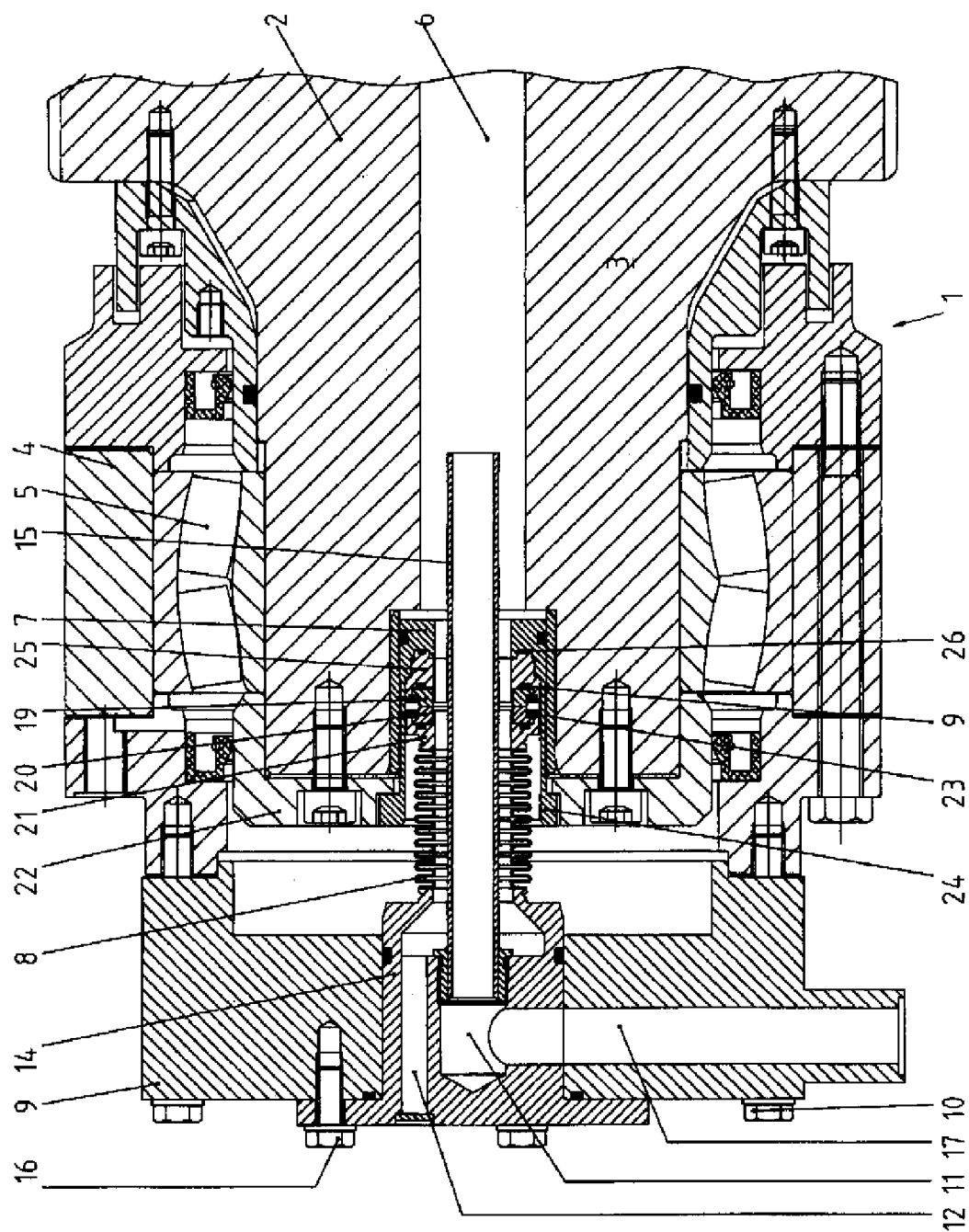
FIG. 2 shows a partial view of a further embodiment of the device according to the present invention in the longitudinal section.

In the embodiment shown in FIG. 2, the arrangement of the sealing elements and their respective mounting is inverted compared to the embodiment shown in FIG. 1. As shown in FIG. 2, the elastic sleeve which is configured as a compensator is fixed on the pillow block cover 9, whereas the first sealing element 19 is arranged, by means of a sliding ring carrying sleeve 25, on the bush.

As shown in FIG. 3, the cross-sectional view of the embodiment of the device according to the invention along the line A-A of FIG. 1 illustrates the course of the coolant ducts 17, 18 in the pillow block cover 9 and the transition of the same 17, 18 to the inset 14.

What is claimed is:

1. A device for coupling a coolant supply to a roller for continuous casting installations, the roller configured to be supplied with a coolant via an axial roller borehole extending at least partially through the roller, the device comprising:
a stationary pillow block supporting the roller in roller bearings,
a sealing unit for pressure-tight attachment to the axial roller borehole of the roller journal;
a pillow block cover attached to the stationary pillow block for covering the axial roller borehole, said pillow block cover being stationary and having at least one coolant duct having a first end fluidly connected to the coolant supply and a second end coupled via the sealing unit to the axial roller borehole; and
a rotatable bush insertable into a seat in the axial roller borehole and secured in the roller borehole for rotation with the roller via a screw-less plug-in connection,
wherein the sealing unit includes a first sealing element arranged in fixed rotative engagement with the rotatable bush and having a first sealing surface, and a second sealing element having a second sealing surface running on the first sealing surface and supported by or integrated into the stationary pillow block cover, said first and second sealing elements configured as sliding rings running on each other.

2. The device of claim 1, wherein the second sealing element is releasably connected with the pillow block cover by a screw-less plug-in connection.

3. The device of claim 1, further comprising an elastic sleeve fixed in a pressure-tight manner on the bush for support of the first sealing element.

4. The device of claim 1, further comprising an elastic sleeve fixed in a pressure-tight manner on the pillow block cover for support of the second sealing element.

5. The device of claim 1, wherein the bush has a mechanical stop to limit a plug-in depth in the axial roller borehole.

6. The device of claim 1, wherein the screw-less plug-in connection is constructed with an antitwist protection.

7. The device of claim 2, wherein the screw-less plug-in connection for releasably connecting the second sealing element to the pillow block cover is constructed with an antitwist protection.

8. The device of claim 1, wherein the bush comprises pulling-off means for engagement by a pulling-off device for removing the bush from the roller borehole.

9. The device of claim 3, wherein the elastic sleeve comprises a compensator.

10. The device of claim 4, wherein the elastic sleeve comprises a compensator.

11. The device of claim 1, further comprising an inset, configured to extend through a center opening of the pillow block cover and to support the sealing unit, said inset having a flange attached external to the pillow block cover and at least a first coolant duct which fluidly connects to the coolant duct in the pillow block cover and the sealing unit, for coupling the copolant supply via the sealing unit to the axial roller borehole in a pressure-tight manner, wherein an inside diameter of the center opening of the pillow block cover is greater than an outside diameter of the bush to enable a removal of the sealing unit from the roller borehole without removal of the pillow block cover.

12. The device of claim 11, wherein the inset comprises a second coolant duct, said first and second cooling ducts being fluidly connectable to the one coolant duct and a further coolant duct in the pillow block cover in one-to-one correspondence.

13. The device of claim 12, wherein one of the coolant ducts of the pillow block cover is intended for supply of coolant, and the other one of the coolant ducts of the pillow block cover is intended for removal of coolant.

14. The device of claim 1, further comprising a connection pipe received in the at least one coolant duct of the pillow block cover and supported by the pillow block cover for connection to a pillow block footprint coupled to a coolant supply or a coolant removal.

15. The device of claim 1, wherein each of the sliding rings is secured by means of a securing ring.

16. The device of claim 15, wherein each of the sliding rings comprises a surrounding sliding ring collar for engagement by the securing ring.

17. The device of claim 16, wherein at least one of the sliding rings comprises at least one protrusion which engages in a corresponding recess in a mounting which accommodates the sliding ring.

\* \* \* \* \*